(12) United States Patent
Kamstrup

(10) Patent No.: US 12,659,429 B2
(45) Date of Patent: Jun. 16, 2026

(54) VIDEO-CONFERENCE DEVICE AND METHOD

(71) Applicant: GN HEARING A/S, Ballerup (DK)

(72) Inventor: Lisa Rørbæk Kamstrup, Ballerup (DK)

(73) Assignee: GN HEARING A/S, Ballerup (DK)

( * ) Notice: Subject to any disclaimer, the term of this patent is extended or adjusted under 35 U.S.C. 154(b) by 179 days.

(21) Appl. No.: 18/534,023

(22) Filed: Dec. 8, 2023

(65) Prior Publication Data

US 2024/0214522 A1     Jun. 27, 2024

(30) Foreign Application Priority Data

Dec. 21, 2022     (EP) ..................................... 22215413

(51) Int. Cl.
| | |
|---|---|
| *H04N 7/15* | (2006.01) |
| *G06T 3/40* | (2006.01) |
| *G06T 5/70* | (2024.01) |
| *G06T 7/50* | (2017.01) |
| *G06T 7/70* | (2017.01) |

(Continued)

(52) U.S. Cl.
CPC ............... *H04N 7/152* (2013.01); *G06T 3/40* (2013.01); *G06T 5/70* (2024.01); *G06T 7/50* (2017.01); *G06T 7/70* (2017.01); *G06T 11/60* (2013.01); *G06V 10/761* (2022.01); *H04N 7/157* (2013.01); *G06V 2201/07* (2022.01)

(58) Field of Classification Search
None
See application file for complete search history.

(56) References Cited

U.S. PATENT DOCUMENTS

| | | | | |
|---|---|---|---|---|
| 9,524,588 | B2 * | 12/2016 | Barzuza | .............. H04L 12/1827 |
| 9,621,795 | B1 * | 4/2017 | Whyte | ................... H04R 1/406 |

(Continued)

FOREIGN PATENT DOCUMENTS

| | | |
|---|---|---|
| EP | 3975553 A1 | 3/2022 |
| WO | 2018005235 A1 | 1/2018 |

OTHER PUBLICATIONS

The extended European search report issued in European Application No. 22215413.0, dated Jun. 19, 2023, 12 pages provided.

(Continued)

*Primary Examiner* — Duc Nguyen
*Assistant Examiner* — Asad Mohammed
(74) *Attorney, Agent, or Firm* — HSML P.C.

(57) ABSTRACT

A video-conference device for providing an augmented view of in-room participants in a video-conference. The image sensor is configured to capture images comprising the room and the in-room participants. The device comprises a depth sensor configured for measuring the distance to each of the in-room participants having a processing unit configured for providing the augmented view of the in-room. The processing unit is configured to performing an image processing of the captured images from the image sensor to virtually identify each of the in-room participants. The processing unit is configured to determining a desired virtual position for each of the in-room participants in the augmented view. The processing unit is configured to performing a virtual scaling of each of the in-room participants to the desired virtual size.

19 Claims, 8 Drawing Sheets

(51) Int. Cl.
     *G06T 11/60*      (2006.01)
     *G06V 10/74*      (2022.01)

(56)            References Cited

U.S. PATENT DOCUMENTS

| | | | |
|---|---|---|---|
| 2011/0153738 A1* | 6/2011 | Bedingfield | H04N 21/43615 |
| | | | 709/204 |
| 2013/0100235 A1* | 4/2013 | Vitsnudel | G06F 3/042 |
| | | | 348/14.05 |
| 2013/0182905 A1* | 7/2013 | Myers | A61B 5/1113 |
| | | | 382/103 |
| 2016/0277712 A1* | 9/2016 | Michot | G06T 7/20 |
| 2020/0294317 A1 | 9/2020 | Segal | |
| 2023/0244799 A1* | 8/2023 | Sharma | G06F 21/604 |
| | | | 726/26 |
| 2023/0351915 A1* | 11/2023 | Chopdekar | H04L 65/1089 |
| 2024/0029472 A1* | 1/2024 | Shen | G06V 10/82 |

OTHER PUBLICATIONS

Sae-Woon Ryu et al: "Tangible video teleconference system using real-time image-based relighting", IEEE Transactions on Consumer Electronics, IEEE Service Center, New York, NY, US, vol. 55, No. 3, Aug. 1, 2009 (Aug. 1, 2009) , pp. 1162-1168, XP011277772, ISSN: 0098-3063, DOI: 10.1109/TCE.2009.5277971.

* cited by examiner

4', (1x1,1y1,1z1)

18

4, (2x1,2y1,2z1)

4", (3x1,3y1,3z1)

B12          A2          B23

A1          A3

2,12,14,16

Size n          Size n

Size 1/2 n

4

4'

4"

900

VIDEO-CONFERENCE DEVICE AND METHOD

FIELD

The present invention relates to a video-conference device. More specifically, the disclosure relates to a video-conference device for providing an augmented view of in-room participants in a video-conference, where the device is configured to be arranged in a room, and where a first number of participants is the in-room participants present in the room while the video-conference is held, and where the device comprises an image sensor configured for capturing images comprising the room and the in-room participants.

BACKGROUND

Video-conference devices are being used more and more for conducting online video meetings with participants sitting in different locations, such as different offices, different cities, different countries etc. However, sometimes, the view of the participants in a video-conference meeting is not optimal or suitable.

Thus, there is a need for an improved video-conference device providing an improved view of the participants in the video-conference meeting.

SUMMARY

Disclosed is a video-conference device for providing an augmented view of in-room participants in a video-conference. The device is configured to be arranged in a room. A first number of participants is the in-room participants present in the room while the video-conference is held. A second number of participants is far-end participants present at one or more different locations than the room. The device comprises an image sensor configured for capturing images. The image sensor is configured to capture images comprising the room and the in-room participants. The device comprises a depth sensor configured for measuring the distance to each of the in-room participants. The device comprises a processing unit configured for providing the augmented view of the in-room participants by a processed/augmented video based on the captured images from the image sensor and the measurements by the depth sensor. The processing unit is configured to obtaining the measurement of the distance to each of the in-room participants by the depth sensor. The processing unit is configured to obtaining the captured images by the image sensor. The processing unit is configured to performing an image processing of the captured images from the image sensor to virtually identify each of the in-room participants. The processing unit is configured to determining a desired virtual position for each of the in-room participants in the augmented view. The processing unit is configured to determining a scaling factor for a desired virtual size of each of the in-room participants. The processing unit is configured to performing a virtual scaling of each of the in-room participants to the desired virtual size. The processing unit is configured to performing a virtual positioning of each of the in-room participants in the augmented view.

It is an advantage that so-called dead space in a video conference is removed while keeping the proportionality of the meeting participants. Dead space may be areas in an image which contains no information or no relevant information, such as walls, doors, windows etc., which can be left out of the image without losing any relevant information.

The solution uses a combination of hardware products comprising an image sensor, e.g. a camera, and a depth sensor, e.g. a time-of-flight (ToF) sensor, and also a software solution/service comprising a processing unit performing, e.g. real-time, image processing of images etc.

It is an advantage to provide a common view of the in-room participants, where all the in-room participants are present in the same view, and where the in-room participants appear to sit close together even though they in reality sit with a distance to each other, because this saves dead space in the view for the far-end participants, as well as the in-room participants will appear to sit closer to the camera and hence sitting virtually closer to the far-end participants. Since there is no information in the dead space between the in-room participants, it is an advantage to virtually remove this dead space. Thus, the augmented view is preferred over a view where there is dead space between the in-room participants.

It is an advantage that the relative position of all the in-room participants is maintained in the augmented view, such that the same people who sit next to each other in the room, also appear to sit next to each other in the augmented view. This is an advantage because when the in-room participants then talk to each other or turn their heads or bodies towards each other, then they still appear to talk to or be turned towards the correct other in-room participant(s).

It is a problem of prior art solutions, that if in-room participants choose to or are required to sit with a distance to each other, e.g. for health and/or safety reasons, then for the remote and far-end participants it will appear/seem that the in-room participants are further away in a common view, because all in-room participants are captured in the same common view where a lot of dead space areas with no people or other information are present, but that do not serve a better far-end experience, it only adds to excessive data transfer.

Thus, it is an advantage of the present invention that it provides an augmented in-room together mode/view for the far-end participants, because synthetically merged close-up captures of the in-room participants creates a higher sense of co-presence with in-room participants for the far-end participants, without compromising the understanding of the room and the people proportions and the safety of actual in-room distancing.

It is an advantage that the image sensor provides portrait zoom of each in-room participants which may then be artificially merged with the background of the room, e.g. a naked-room view. It is an advantage that the in-room participants can appear to be captured in a closer viewing angle without compromising proper distancing of the in-room participants. The proportions of each image sensor capture are synthetically altered to fit with the proportions of the background of the room, e.g. the naked meeting room view, and with an augmented closer seating.

The device comprises an image sensor, and the image sensor may be able to perform a wide angle capture of the room, and it is an advantage to utilize the image sensor capture of the room, e.g. the wide angle, such as full-room, capture, together with a processing unit being able to identify people within a capture, to thereby create cropped-out portraits of each in-room participant. Optionally, the device, and the image sensor can perform a pre-shot of the meeting room prior to participants entering the room, to thereby obtain a naked meeting room capture, hereby also providing a somewhat true-to-time-of-day/meeting room lighting conditions.

Further, with implementation of a depth sensor, e.g. a time of flight (ToF) sensor, and the image sensor, it is possible to determine the exact seating distance of the participants from the device to the meeting room background/walls as well as between the participants. Combining the above information, it is possible to augment individual cropped portraits of participants, e.g. from boundary boxes, onto a background of the room, e.g. a naked meeting room capture, and synthetically adjust with the depth sensor, e.g. ToF, information, so that proportions of cropped portraits match proportions of the background of the room, e.g. an actual naked meeting room capture.

The advantage of this for the far-end participants, or for a remote-end, is to remove actual 'dead space' between the in-room participants, thereby also eliminating the need to send excessive room information. There may be a lot of dead space between the in-room participants due to required or chosen distancing between the in-room participants. It is an advantage to obtain a more close-up viewing of the in-room participants because this adds to a higher sense of co-presence between the far-end, or remote, participants, and the in-room participants. It is an advantage to instead of seeing dead space in the view, placing the in-room participants artificially closer to each other, while maintaining the understanding and authentic look of the meeting room proportionality and the actual participant seating. That is, the cropped participant portraits overlayed onto the background of the room, e.g. a naked meeting capture, where the in-room participants will be placed synthetically closer to each other, will, by using the obtained information of the meeting room geometry/depth as well as the original seating distance of the participants, appear much more realistically positioned in that it is thereby possible to adjust the size and potentially also the angle of the portrait captures, so the in-room participants will appear true-to-life in proportionality when artificially seated closer together.

The invention has advantages compared to prior solutions of existing in-market augmentations. Examples like unified communication providers that offer augmented meeting room backgrounds or camera vendors that offer 360 degree captures of in-room participants all lack authenticity and ability to maintain room geometry, because in the crop-out portraits of the in-room participants, the prior solutions fail to display true-to-life room- and seating proportionality in the final augmented meeting room view.

In the prior art solutions, the participants may not look realistic, because the augmented seating as well as applied virtual background in the prior solution may look disproportional and fake. In e.g. prior art 360 degree camera vendors, there is no resizing of people in the view. In other prior art solutions, no segmentation of people in the image is performed in order to resize the people to fit into an augmented, common image.

The video-conference device is for providing an augmented view of in-room participants in a video-conference. The device is configured to be arranged in a room. The device may be fixed/stationary arranged in the room. The device may be a stationary device. The device may not be a handheld device. The device may or may not be portable.

The room may be a meeting room, a video conference room, etc. The room may have a background e.g. walls, windows, doors. The room may have a foreground e.g. in-room participants. The room may also have a middle-ground e.g. furniture, white boards etc.

A first number of participants is the in-room participants present in the room while the video-conference is held. There may be one or more in-room participants.

A second number of participants is far-end participants present at one or more different locations than the room. There may be one or more far-end participants, who all are at a remote location. The far-end participants may be at different locations.

The device may be configured for visual and auditory communication, which may be video conference calls and/or broadcasts. Broadcasts may be live or recorded.

The device may be configured for communication between the in-room participants and the far-end participants. The in-room participants are physically present in the physical room of the device, e.g. in the meeting room where the device is located. The far-end participants are not present in the room of the device. The far-end participants are present at a remote location, such as in their own homes, in another office building, in another city, another country, etc. There may be one far-end participant in a first remote location, and another far-end participant in a second remote location. Thus, the device may provide communication between more than two locations, such as three, four or more locations.

The video-conference device may be a Jabra Panacast video-conference device.

The device comprises an image sensor configured for capturing images. The captured images may be processed as a processed/augmented video. The image sensor may comprise one or more image sensors. The image sensor may be a camera. The camera may be an RGB-camera (red-green-blue camera). The image sensor may be a high-resolution image sensor. The image sensor may be a wide-angle image sensor, such as between 140 and 180 degrees, such as 180 degrees view. The device, and thereby also the image sensor, may be fixated in the room, e.g. mounted on a wall or arranged on a desk or table.

The image sensor is configured to capture images comprising the room and the in-room participants. Thus, the image sensor may capture images covering a part of the room or the entire room. And the image sensor may capture images covering all the in-room participants or some of the in-room participants. The image sensor may capture images covering an entire in-room participant or a part of the in-room participant.

The in-room participants will typically sit in chairs around a table, and the image sensor will typically be arranged such that it captures the parts of the in-room participants which are above the table top, e.g. the upper body, arms and head of the in-room participants.

The device comprises a depth sensor configured for measuring the distance to each of the in-room participants. The depth sensor may be configured for measuring the distance to various parts or objects in the room, such as also measuring the distance to the walls of the room, such as the background walls etc.

The image sensor may preferably be a high quality image sensor, and the depth sensor may capture in low resolution, thus it is an advantage to provide both an image sensor and a depth sensor in the video-conference device.

The depth sensor and the image sensor may be arranged close to each other in the device, such as next to each other or adjacent, because this may be an advantage when combining the information of the in-room participants and of the room obtained from the image sensor and the depth sensor.

The device comprises a processing unit configured for providing the augmented view of the in-room participants by a processed/augmented video based on the captured images from the image sensor and the measurements by the depth sensor. The augmented/processed video is configured to be provided as streamed/transmitted video to the far-end participants.

It is an advantage that the processing of the image data and depth data is performed in the video-conference device itself and not in another device, such as a remote device, such as in a cloud, since hereby no latency in processing will occur as there is no transmission of data back and forth between the device/room/location and a remote, e.g. cloud, processing. Furthermore, it is an advantage that privacy for the participants is secured since no data is sent to a cloud. Yet further, it is an advantage that power is saved because no data is sent, using power, to a cloud and back.

The processing unit is configured to obtaining the measurements of the distance to each of the in-room participants by the depth sensor. Obtaining the measurements may comprise receiving the measurements from the depth sensor and/or performing the measurements based on data provided by the depth sensor. The distance to each of the identified in-room participants may be determined. The distance may be measured to one or more points on the participants etc. The distance to other objects or parts of the room may also be measured, such as the distance to a first wall, a second wall, a first end/corner of a table, a second end/corner of a table etc. whereby a depth measurement of the room is obtained. The distance may be measured from the device, and/or from the depth sensor, and/or from the image sensor.

The processing unit is configured to obtaining the captured images by the image sensor. Obtaining the captured images may comprise receiving the captured images from the image sensor.

The processing unit is configured to performing an image processing of the captured images from the image sensor to virtually identify each of the in-room participants. The processing unit may be configured to performing an image processing of the captured images to identify and virtually separate each of the in-room participants from the captured images. The in-room participants may be virtually identified from a background of the room in the images. The virtual identification may comprise face recognition of the in-room participants. The virtual identification may comprise body/posture detection of the in-room participants. The virtual identification may comprise virtual cropping of the head, and potentially also upper part of torso and arms, of the in-room participants. The virtual identification may comprise providing a boundary box around at least a part of the in-room participants, such as the head and upper torso and arms. The virtual identification may comprise virtual image segmentation for partitioning of a digital image into multiple image segments, also known as image regions or image objects, defined by sets of pixels. The virtual identification may comprise virtual carving out or virtual cut-out of the in-room participants.

A boundary box may be rectangular, such as squared. A boundary box may not follow the contour of the in-room participants, but may be a box to cover a part of the in-room participant.

The processing unit is configured to determining a desired virtual position for each of the in-room participants in the augmented view. The desired virtual position may be a position on a virtual background of the room. The desired virtual position is a position which corresponds to the actual position, i.e. the seating order of the in-room participants should be maintained, such that in-room participants appear to sit next to the same people as they do in the actual room.

The desired virtual position may be a position where the in-room participants appear to sit closer to each other than in the actual room.

The processing unit is configured to determining a scaling factor for a desired virtual size of each of the in-room participants. The scaling factor may typically be larger than one, and the desired virtual size may typically be larger than the actual size of the in-room participants, such that the in-room participants appear to have a bigger size, i.e. be bigger, in the augmented view, which will provide that the in-room participants appear to sit closer to the image sensor. This is an improved view for the far-end participants, who will then feel that the in-room participants are physically closer than they are. The bigger the room, the more scaling may be made. The bigger the actual distance between the in-room participants is, the more scaling may be made.

The processing unit is configured to performing a virtual scaling of each of the in-room participants to the desired/determined virtual size in the augmented view. Thus, the image parts comprising the in-room participants, e.g. the cropped parts of the in-room participants, is virtually changed to obtain the desired virtual size.

The processing unit is configured to performing a virtual positioning of each of the in-room participants in the augmented view. Thus, the in-room participants are virtually positioned in the augmented view, e.g. on the virtual background of the room, to obtain an improved view, such as view where the in-room participants appear to sit closer to each other and closer to the image sensor.

The proportionality and the seating order of the in-room participants may be maintained, since this will provide that the augmented view looks more natural.

The video-conference device may be configured to be connected to the Internet. Alternatively, and/or additionally, video-conference device may be connected to a host, such as a computer, pc, tablet, or mobile phone, where the host may have an Internet connection.

The video-conference device may be configured for providing a video-feed from the room. The video-feed may be a real-time video recording at the room. The video-feed may be a video recording of the entire time period where the video-conference device is performed/on-going.

The video-conference device may be configured to connect to a unified communication cloud server for enabling/performing cloud communication service. The connection between the video-conference device and the unified communication cloud server may be a wireless connection. The unified communication cloud server may be a cloud server of a unified communication provider, such as the provider of e.g. the cloud communication services like Microsoft "Teams", "Zoom", "Skype", "Bluejeans" etc. The cloud communication service may be provided by means of a software application, i.e. an app, provided by the unified communication provider. The unified communication provider is a third party in the present system. The cloud communication service differs from traditional IP calls, phone call, and smartphone call. The cloud communication service requires using an app or webpage to perform the communication through. The cloud communication service can be performed using an electronic device, such as a computer, pc, tablet or smart phone. The cloud communication does not use or require traditional telephony, which may be defined as operation of telephones and telephonic systems and as a system of telecommunications in which telephonic equipment is employed in the transmission of speech or other sound between points, with or without the use of wires. The cloud communications may be Internet-based voice and data communications where telecommunications applications, switching and storage may be hosted by a third-party outside of the organization using them, and they may be accessed over the public Internet. Data may comprise audio and/or video. Cloud services may be defined as data-center-hosted services that are run and accessed over an Internet infrastructure. Cloud services may handle data as well as audio and video, because with the use of VoIP (voice over Internet protocol), voice has become part of the cloud services. Cloud telephony, also known as hosted telephony, may refer specifically to voice services and more specifically the replacement of conventional business telephone equipment, such as a private branch exchange (PBX), with third-party VOIP service. Cloud communications providers may deliver voice, audio, video and data communications applications and services, hosting them on servers that the providers own and maintain, giving their customers access to the "cloud."

The video-conference device may comprise application programming interfaces (APIs) and/or software development kits (SDKs) with the unified cloud communication server/providers for allowing communication and various features and functionalities. The SDK/API is a software tool or solution which is configured to easily integrate the video-conference device provider, e.g. Jabra, application to 3rd part applications, thereby allowing applications to communicate across on the system provider hardware, e.g. Jabra hardware, such as the video-conference device. A software development kit (SDK) is a collection of software development tools in one installable package. An application programming interface (API) is a computing interface which defines interactions between multiple software intermediaries. It defines the kinds of calls or requests that can be made, how to make them, the data formats that should be used, the conventions to follow, etc. It can also provide extension mechanisms so that users can extend existing functionality in various ways and to varying degrees. An API can be entirely custom, specific to a component, or it can be designed based on an industry-standard to ensure interoperability. Through information hiding, APIs enable modular programming, which allows users to use the interface independently of the implementation.

The video-conference device may comprise a functionality service software embedded in the video-conference device. The functionality service software is configured for controlling a number of functionalities of the video-feed to generate a processed video-feed. Thus, the video-conference device may be configured for providing augmentations in the visual communication. The augmentation may be add-on of digital content and/or image processing features such as object and face recognition etc. Furthermore, the functionality service software may also be configured for controlling audio of the video-conference device.

The processed video-feed from the room may be configured to be provided to the far-end participant(s) via a cloud communication service.

According to an aspect disclosed is a method, performed in a video-conference device, for providing an augmented view of in-room participants in the video-conference. The device is configured to be arranged in a room, where a first number of participants is the in-room participants present in the room while the video-conference is held, and a second number of participants is far-end participants present at one or more different locations than the room. The device comprises an image sensor configured for capturing images, the image sensor being configured to capture images comprising the room and the in-room participants. The device comprises a depth sensor configured for measuring the distance to each of the in-room participants. The device comprises a processing unit configured for providing the augmented view of the in-room participants by a processed/augmented video based on the captured images from the image sensor and the measurements by the depth sensor. The method comprises, in the processing unit:

obtaining the measurements of the distance to each of the in-room participants by the depth sensor;

obtaining the captured images by the images sensor;

performing an image processing of the captured images from the image sensor to virtually identify each of the in-room participants;

determining a desired virtual position for each of the in-room participants in the augmented view;

determining a scaling factor for a desired virtual size of each of the in-room participants;

performing a virtual scaling of each of the in-room participants to the desired virtual size in the augmented view; and performing a virtual positioning of each of the in-room participants in the augmented view.

In some embodiments, the processing unit is configured for performing the virtual positioning of each of the in-room participants in the augmented view such that the in-room participants are virtually positioned closer to each other and closer to the image sensor capturing the images. Thus, in the augmented view, the in-room participants appear to be positioned closer to each other than their actual physical positions. Thus, in the augmented view, the in-room participants appear to be positioned closer to the image sensor than their actual physical positions.

All in-room participants will typically be in the image sensor view. But as the in-room participants may sit with a distance to each other, the participants may appear quite small, when the view covers all in-room participants, e.g. when there are several in-room participants. It is an advantage of the video conference device that the image sensor/camera/video feed will be augmented such that it appears that the in-room participants sit closer together, by virtually placing them closer together, and thereby they can also appear bigger because the dead space between the participants is removed and instead filled with in-room participants in a virtual area, so it is possible to virtually increase the size of the participants. For the far-end participants this will provide the appearance that the in-room participants are closer to the image sensor/camera, and may approximately appear to have the same size each, and this will provide the appearance/feeling of being closer together.

Furthermore, it is an advantage that this will save power, because less data will need to be transmitted to the far-end participants, since there is less empty space of the room is in the virtual view.

In some embodiments, the processing unit is configured for performing the virtual positioning of each of the in-room participants in the augmented view such that the relative positions of the in-room participants relative to each other are maintained.

It is an advantage that the seating order of the in-room participants are maintained, i.e. who is sitting next to each other, who is sitting in front of each other, because hereby the in-room participants' bodies, faces and eyes still point in the right direction relative to the other in-room participants in the augmented view.

In some embodiments, the device is configured to be located in one end of the room. This may be e.g. on a wall or on a table top against a wall. The device may or may not be configured to be located in a center of the room, such as in a center of a table, with the in-room participants sitting around the entire table.

In some embodiments, the image sensor, the depth sensor and the processing unit of the device are co-located, such as arranged in one physical unit.

In some embodiments, the processing unit is configured to:

determining a distance A to each of the in-room participants thereby obtaining an actual position (x1,y1,z1) of each in-room participant;

determining a distance B between the in-room participants;

determining a relative location of the in-room participants based on the determined distance A and distance B;

determining the scaling factor N for the desired virtual size of each of the in-room participants based on the determined distance A and distance B; and determining the virtual position (x2,y2,z2) of each of the in-room participants in the augmented view based on the determined relative location of the in-room participants.

The distance A to each of the in-room participants may be determined from the video-conference device such as from the image sensor and/or depth sensor and/or processing unit. Each in-room participant P may be at a unique distance A, thus a first in-room participant P1 may be at a distance A1 having the actual position (1x1,1y1,1z1), and a second in-room participant P2 may be at a distance A2 having the actual position (2x1,2y1,2z1), and a third in-room participant P3 may be at a distance A3 having the actual position (3x1,3y1,3z1). Both a distance A and an angle α may be determined for each in-room participant. The distance B between the in-room participants may be determined based on the obtained actual position (x1,y1,z1) for each in-room participant. Thus a distance B12 between the first in-room participant P1 and the second in-room participant P2 may be determined based on their positions (1x1,1y1,1z1) and (2x1, 2y1,2z1).

The scaling factor N for the desired virtual size of each of the in-room participants may be determined, such that the scaling factor N1 for the first in-room participant P1 is determined, and the scaling factor N2 for the second in-room participant P2 is determined, and the scaling factor N3 for the third in-room participant P3 is determined.

In some embodiments, the depth sensor comprises one or more of:

a time of flight (ToF) sensor configured for determining path lengths;

an infra-red sensor configured for determining distances based on reflected light;

an acoustic sensor configured for determining distances based on reflected audio.

A depth sensor and an image sensor may be combined into a depth sensor camera. Depth sensor cameras are basically two cameras in one body. One is a traditional RGB camera, while the other is an infrared (IR) camera. The IR camera is used to measure the distance between the camera and objects in the scene. This information is then used to calculate the depth of field for each image.

A depth sensor may comprise an infrared (IR) light projector and an IR camera to sense the distance between objects. The projector may send out a grid of IR dots, and the camera may measure how long it takes for each dot to bounce back. By knowing the speed of light, the depth sensor can calculate how far away each object is.

A time-of-flight (ToF) sensor or camera is a range imaging camera system employing time-of-flight techniques to resolve distance between the camera and the subject for each point of the image, by measuring the round trip time of an artificial light signal provided by a laser or an LED.

Time-of-flight is a measurement of how long it takes a particle, wave, or object to travel a certain distance. In the case of a ToF sensor/camera, it uses light to measure distance.

A type of time-of-flight sensor uses a form of LIDAR (Light Detection And Ranging) known as scannerless LIDAR. It's a remote sensing method that fires an infrared light pulse to measure distance.

A depth sensor may comprise a 3D sensor, a ToF sensor, a depth camera, or even ToF 3D camera.

The depth sensor may use light to measure how far objects are from the sensor and may use that information to map out the room/scene/world in 3D.

In some embodiments, the image processing of the captured images to identify the in-room participants is performed by using one or more of:

virtual image segmentation;

virtual cut-out to virtually separate the in-room participants from the background;

virtual image resizing;

virtual seam carving.

Image segmentation is the process of partitioning a digital image into multiple image segments, also known as image regions or image objects (sets of pixels). The goal of segmentation may be to simplify and/or change the representation of an image into something that is easier to analyze. Image segmentation may be used to locate objects and boundaries (lines, curves, etc.) in images. More precisely, image segmentation may comprise a process of assigning a label to every pixel in an image such that pixels with the same label share certain characteristics. The result of image segmentation may be a set of segments that collectively cover a part of the image, the entire image, or a set of contours extracted from the image. Each of the pixels in a region may be similar with respect to some characteristic or computed property, such as color, intensity, or texture.

Seam carving is a computer graphics technique for resizing images so as to preserve the main contents by selectively removing less important regions, as defined by "seams" (approximately horizontal or vertical paths of pixels).

Seam carving (or liquid rescaling) is an algorithm for content-aware image resizing. It functions by establishing a number of seams (paths of least importance) in an image and automatically removes seams to reduce image size or inserts seams to extend it. Seam carving also allows manually defining areas in which pixels may not be modified, and features the ability to remove whole objects from photographs. Seams may be either vertical or horizontal. A vertical seam may be a path of pixels connected from top to bottom in an image with one pixel in each row. A horizontal seam is similar with the exception of the connection being from left to right. The importance/energy function values a pixel by measuring its contrast with its neighbor pixels. Seam carving may comprise calculating the weight/density/energy of each pixel in an image.

This can be done by various algorithms: gradient magnitude, entropy, visual saliency. From the energy, a list of seams may be made. Seams may be ranked by energy, with low energy seams being of least importance to the content of the image. Seams can be calculated via a dynamic programming approach. Then the low-energy seams may be removed as needed, and a final resized image may be obtained.

Thus, this technique may comprise producing many stitch lines and looking for clusters providing that many pixels of "dead space" can be removed. Dead space may be defined by the cost function embedded in an algorithm.

In some embodiments, the image processing is performed in two-dimensions (2D) and/or in three-dimensions (3D).

If performing the image processing in two-dimensions, a single image sensor may be used. If performing the image processing in three-dimensions, more image sensors may be used, such as both an image sensor in front of the in-room participants, an image sensor on one or more sides of the in-room participants, and an image sensor behind the in-room participants. By having more than one image sensor, the in-room participants can be captured from more sides and hereby a 3D image can be obtained. When a 3D image is obtained, this image may be rotated, e.g. the in-room participant in the 3D image may be virtually rotated in the augmented view. Furthermore, both image sensors and depth sensors located in multiple areas in the room may be used to be able to understand depth of people, objects and room context in a 360 degree manner. In that way, a full 3D (or volumetric) model of the room and in-room items, such as people and objects, can be created.

In some embodiments, the depth sensor is configured for measuring the distance to objects/parts of the room, and wherein the image sensor is configured to capture images comprising the room with no in-room participants, and wherein the processing unit is configured for:

mapping the room with no in-room participants, by determining distances C between the depth sensor and one or more objects/parts of the room.

Mapping the room with no in-room participants may be referred to as "naked room capture" or "pre-meeting room capture". It is an advantage to obtain the mapping of the room with no in-room participants because this can be used to obtain or provide a clean view of the meeting room with no participants in, which can be used as the virtual background of the augmented view, such as a clean virtual background of the room, which can be used as the background of the augmented view, where the in-room participants are then virtually positioned according to their determined virtual sizes and positions.

The naked room capture can be obtained by capturing images in the room before the video-conference, such as on the same day. Alternatively and/or additionally, the naked room capture can be selected from a library of pre-made captures of the room, or other rooms. The naked room capture may be with or without chairs. The naked room capture will typically be with a conference table in the room. It may be preferred to have removed the chairs of the room and only have the table and other fixed items left. Because when the in-room participants are augmented into the 'naked meeting room' capture, it may work best if the in-room participants are captured with the chair that they are actually sitting on.

The depth sensor is configured for measuring the distance to objects/parts of the room, and the objects or parts of the room may be e.g. tables, chairs, walls, doors, windows, white boards etc.

Determining the distances C between the depth sensor and one or more objects/parts of the room may comprise determining more different points at the objects/parts, e.g. more points on the table, such as points in different ends of the table etc.

Determining the distances C between the depth sensor and one or more objects/parts of the room may comprise determining distances C and angles α.

In some embodiments, the processing unit is configured for defining a suitable illumination in the augmented view based on the time of day of the video-conference.

The illumination may comprise lightning, such as appearance of artificial light. The time of day may be e.g. morning, mid-day, late afternoon, evening, and the illumination may thus be more or less bright/dark. The illumination may reflect the natural day light in a pre-meeting capture or may be selected from a library of illumination choices.

In some embodiments, the processing unit is configured for performing blurring of objects in the augmented view of the room.

The objects which may be blurred may be doors, windows, pictures, white boards etc. which are not desirable to see, such as see clearly, in the video conference. Furthermore, blurring may be used to cover that lines in images which are processed may not match with lines of other processed images or with lines of images which are not processed. E.g. the lines of an edge of a table may be present in the capture images, e.g. also in the part of images where the in-room participants are, however when the images are processed and content are e.g. virtually removed from an image, the lines of the table may not match anymore, and then blurring can be performed to cover this, such that it is not disturbing in the augmented image.

In some embodiments, the processing unit is configured for:

in accordance with a determination that a criterion for the virtual positioning of an in-room participant is not satisfied:

forgoing performing the virtual positioning of the in-room participant in the augmented view, and virtually placing the in-room participant in a dedicated picture/box in the augmented view.

It is an advantage to virtually place an in-room participant in a dedicated picture/box, also referred to picture in picture, if the in-room participant looks too unnatural/distorted in the common augmented view with the other in-room participants. An in-room participant may look too unnatural/distorted in the augmented view e.g. if in-room participant sits too close to the image sensor and/or sits too much with the side of the body towards the image sensor. Thus, the criteria may be that the in-room participant looks natural, not distorted etc. Thus, if this is not satisfied, then the in-room participant will be virtually placed in a dedicated picture/box instead of in the common augmented view. The dedicated picture box may be referred to as picture-in-picture (PiP).

In some embodiments, the device further comprises:

a display configured for displaying the augmented view and the far-end participants; and/or an audio output transducer configured for transmitting audio from the far-end participants to the room.

The display may be a screen, such as a TV screen. The display or screen may show augmented view and the far-end participants, e.g. by displaying a video-feed of the far-end participant(s) or by showing a picture of the far-end participant(s) or showing a symbol, if the far-end participants do not have video recording enabled at their remote location.

The display may also show the augmented view, e.g. video-feed, as the far-end participant(s) see it, including any added functionalities.

If the video-conference device does not comprise the display, then the video-conference device may be connected to a pc screen, TV screen or other external screen present in the room.

The audio output transducer may be a speaker, speaker unit, speaker bar, a loudspeaker, receiver etc.

The device may also comprise one or more input transducers, such as microphones, for capturing voices of the in-room participant(s). The input transducer may be a speakerphone, a separate microphone etc.

Disclosed is a system comprising at least two video-conference devices according to claim 1. If two video-conference devices are provided in a room, then an image sensor and a depth sensor will be present at least two places in the room, and this may provide that 3D images of the in-room participants can be made.

The video-conference device may comprise one or more input transducers. The one or more input transducers may comprise one or more microphones. The one or more input transducer(s) may be configured for converting an acoustic signal into a first electric input signal. The first electric input signal may be an analogue signal. The first electric input signal may be a digital signal. The one or more input transducer(s) may be coupled to one or more analogue-to-digital converter(s) configured for converting the analogue first input signal into a digital first input signal.

The video-conference device may comprise one or more antenna(s) configured for wireless communication. The one or more antenna(s) may comprise an electric antenna. The electric antenna may be configured for wireless communication at a first frequency. The first frequency may be above 800 MHZ, preferably a wavelength between 900 MHz and 6 GHz. The first frequency may be 902 MHz to 928 MHz. The first frequency may be 2.4 to 2.5 GHZ. The first frequency may be 5.725 GHz to 5.875 GHz. The one or more antenna(s) may comprise a magnetic antenna. The magnetic antenna may comprise a magnetic core. The magnetic antenna may comprise a coil. The coil may be coiled around the magnetic core. The magnetic antenna may be configured for wireless communication at a second frequency. The second frequency may be below 100 MHz. The second frequency may be between 9 MHz and 15 MHZ.

The video-conference device may comprise one or more wireless communication unit(s). The one or more wireless communication unit(s) may comprise one or more wireless receiver(s), one or more wireless transmitter(s), one or more transmitter-receiver pair(s) and/or one or more transceiver(s). At least one of the one or more wireless communication unit(s) may be coupled to the one or more antenna(s). The wireless communication unit may be configured for converting a wireless signal received by at least one of the one or more antenna(s) into a second electric input signal. The video-conference device may be configured for wired/wireless audio communication, e.g. enabling the users to listen to media, such as music or radio and/or enabling the user to perform phone calls. The wireless signal may originate from one or more external source(s) and/or external devices, such as microphone device(s), wireless audio transmitter(s), smart computer(s) and/or distributed microphone array(s) associated with a wireless transmitter. The wireless input signal(s) may origin from one or more accessory device(s), such as a smartphone and/or a smart watch.

The processing unit may be configured for processing the first and/or second electric input signal(s). The processing may comprise performing feedback cancelation, beamforming, noise reduction, noise cancellation, speech recognition, bass adjustment, treble adjustment and/or processing of user input. The processing unit may be a processor, an integrated circuit, an application, functional module, etc. The processing unit may be implemented in a signal-processing chip or a printed circuit board (PCB). The processing unit may be configured to provide a first electric output signal based on the processing of the first and/or second electric input signal(s). The processing unit may be configured to provide a second electric output signal. The second electric output signal may be based on the processing of the first and/or second electric input signal(s).

The video-conference device may comprise an output transducer. The output transducer may be coupled to the processing unit. The output transducer may be a receiver. It is noted that in this context, a receiver may be a loudspeaker, whereas a wireless receiver may be a device configured for processing a wireless signal. The receiver may be configured for converting the first electric output signal into an acoustic output signal. The output transducer may be coupled to the processing unit via the magnetic antenna.

The wireless communication unit may be configured for converting the second electric output signal into a wireless output signal. The wireless output signal may comprise synchronization data. The wireless communication unit may be configured for transmitting the wireless output signal via at least one of the one or more antennas.

The video-conference device may comprise a digital-to-analogue converter configured to convert the first electric output signal, the second electric output signal and/or the wireless output signal into an analogue signal.

The video-conference device may be connected to a power outlet or may comprise a power source. The power source may comprise a battery providing a first voltage. The battery may be a rechargeable battery. The battery may be a replaceable battery. The power source may comprise a power management unit. The power management unit may be configured to convert the first voltage into a second voltage. The power source may comprise a charging coil. The charging coil may be provided by the magnetic antenna.

The video-conference device may comprise a memory, including volatile and non-volatile forms of memory.

The present invention relates to different aspects including the video-conference device, the method and the system described above and in the following, and corresponding device parts, each yielding one or more of the benefits and advantages described in connection with the first mentioned aspect, and each having one or more embodiments corresponding to the embodiments described in connection with the first mentioned aspect and/or disclosed in the appended claims.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1:
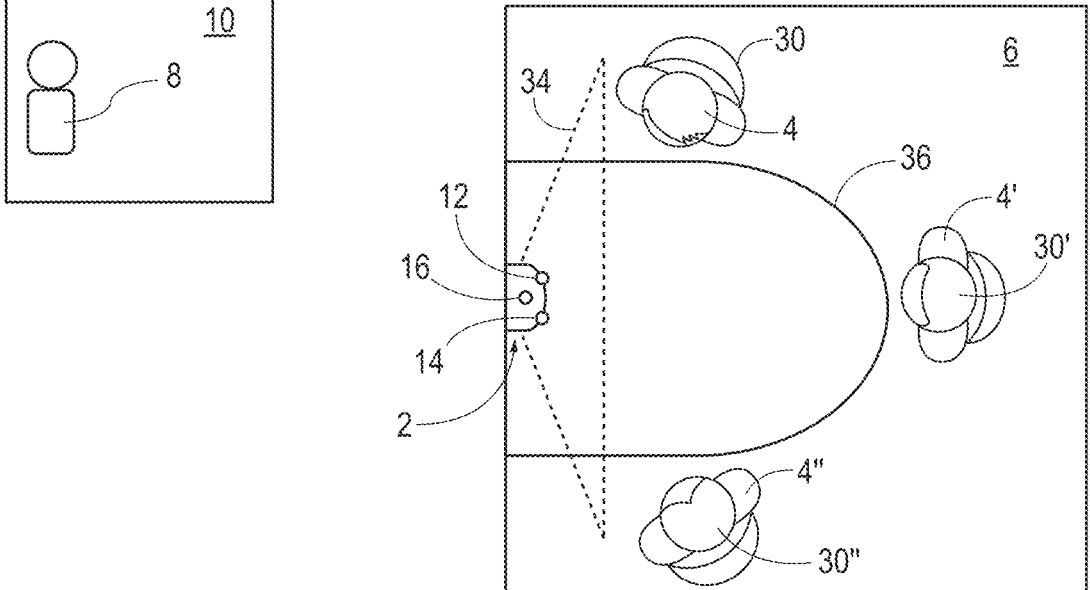
FIG. 1 schematically illustrates an exemplary video-conference device 2 for providing an augmented view of in-room participants 4 in a video-conference.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

FIG. 1 schematically illustrates an exemplary video-conference device 2 for providing an augmented view of in-room participants 4, 4', 4" in a video-conference. The device 2 is configured to be arranged in a room 6. A first number of participants is the in-room participants 4, 4', 4" present in the room 6 while the video-conference is held. A second number of participants is far-end participants 8 present at one or more different locations 10 than the room 6. The device 2 comprises an image sensor 12 configured for capturing images. The image sensor 12 is configured to capture images comprising the room 6 and the in-room participants 4, 4', 4". The device 2 comprises a depth sensor 14 configured for measuring the distance to each of the in-room participants 4, 4', 4". The device 2 comprises a processing unit 16 configured for providing the augmented view of the in-room participants 4, 4', 4" by a processed/augmented video based on the captured images from the image sensor 12 and the measurements by the depth sensor 14. The processing unit 16 is configured to obtaining the measurement of the distance to each of the in-room participants 4, 4', 4" by the depth sensor 14. The processing unit 16 is configured to obtaining the captured images by the image sensor 12. The processing unit 16 is configured to performing an image processing of the captured images from the image sensor 12 to virtually identify each of the in-room participants 4, 4', 4". The processing unit 16 is configured to determining a desired virtual position for each of the in-room participants 4, 4', 4" in the augmented view. The processing unit 16 is configured to determining a scaling factor for a desired virtual size of each of the in-room participants 4, 4', 4". The processing unit 16 is configured to performing a virtual scaling of each of the in-room participants 4, 4', 4" to the desired virtual size. The processing unit 16 is configured to performing a virtual positioning of each of the in-room participants 4, 4', 4" in the augmented view.

The dotted lines 34 indicate the wide-angle view of the image sensor 12.

Each in-room participant 4, 4', 4" is shown to sit in a respective chair 30, 30', 30". The in-room participants 4, 4', 4" are shown to sit around a table 36.

The device 2 is shown as being located in one end of the room 6. This may be e.g. on a wall or on the table 36 top against a wall. The device 2 may not be configured to be located in a center of the room, such as in a center of a table, with the in-room participants sitting around the entire table.

The image sensor 12, the depth sensor 14 and the processing unit 16 of the device 2 are shown to be co-located and arranged in one physical unit being the device 2.

Figure 2A:
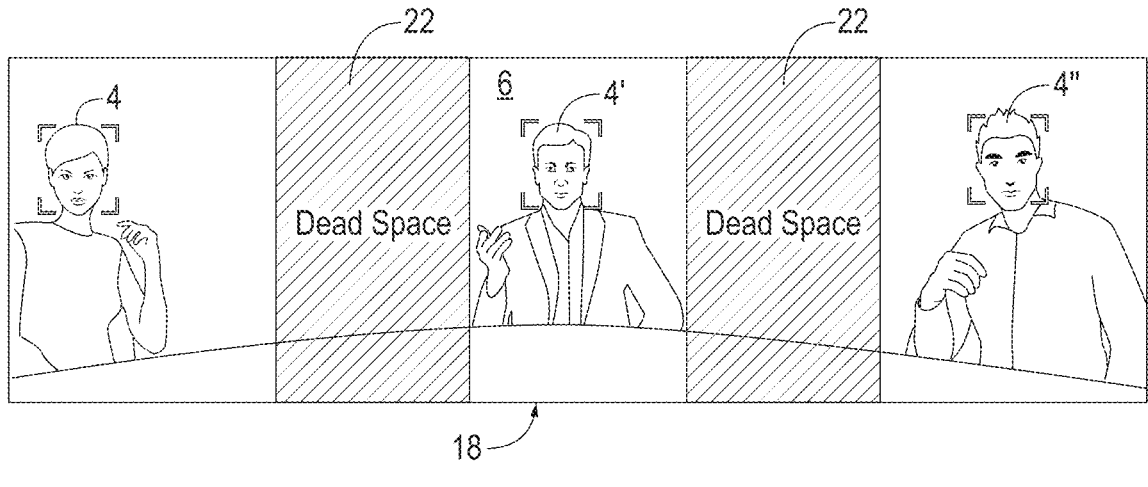
FIGS. 2a and 2b schematically illustrates exemplary images 18 and augmented views 20 of a video-conference provided by a video-conference device which is configured to be arranged in a room 6.
Figure 2B:
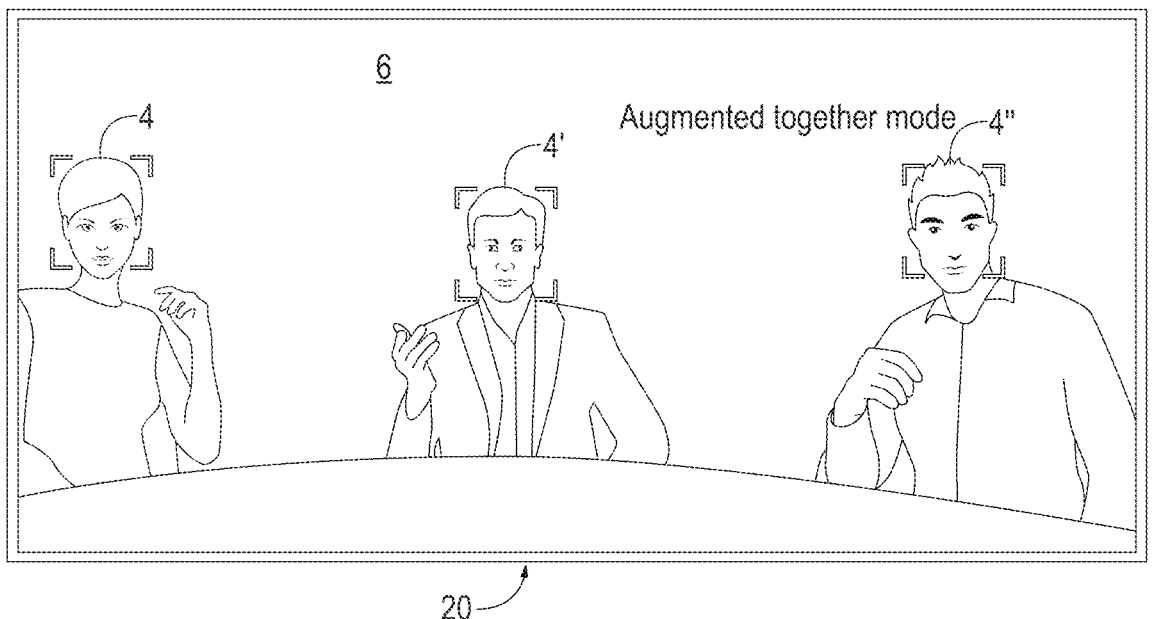

FIGS. 2a and 2b schematically illustrates exemplary images 18 and augmented views 20 of a video-conference provided by a video-conference device (not shown) which is configured to be arranged in a room 6.

FIG. 2a shows an example of a captured image 18 of the room 6 and in-room participants 4, 4', 4".

FIG. 2b shows an example of an augmented view 20 of the room 6 and in-room participants 4, 4', 4", after processing of the image.

The video-conference device is placed in front of the in-room participants 4, 4', 4", who are present in the room 6 while the video-conference is held. A second number of participants is far-end participants (not shown) present at one or more different locations than the room 6.

The device comprises an image sensor (not shown) configured for capturing images 18. The image sensor is configured to capture images 18 comprising the room 6 and the in-room participants 4, 4', 4". The device comprises a depth sensor (not shown) configured for measuring the distance to each of the in-room participants 4, 4', 4". The device comprises a processing unit (not shown) configured for providing the augmented view 20 of the in-room participants 4, 4', 4" by a processed/augmented video based on the captured images 18 from the image sensor and the measurements by the depth sensor. The processing unit is configured to obtaining the measurement of the distance to each of the in-room participants 4 by the depth sensor. The processing unit is configured to obtaining the captured images 18 by the image sensor. The processing unit is configured to performing an image processing of the captured images 18 from the image sensor to virtually identify each of the in-room participants 4, 4', 4".

The processing unit is configured to determining a desired virtual position for each of the in-room participants 4, 4', 4" in the augmented view 20. The processing unit is configured to determining a scaling factor for a desired virtual size of each of the in-room participants 4, 4', 4". The processing unit is configured to performing a virtual scaling of each of the in-room participants 4, 4', 4" to the desired virtual size. The processing unit is configured to performing a virtual positioning of each of the in-room participants 4, 4', 4" in the augmented view 20.

In FIG. 2a, "dead space 22" is marked as being the space between the in-room participants 4, 4', 4" in the image 18, where the dead spaces 22 contain no information or no information relevant for the participants of the video-conference.

In the resulting augmented view 20 of the room 6 and in-room participants 4, 4', 4", which is a processed version of the image 18, the dead spaces 22 are virtually removed.

The processing unit is configured for performing the virtual positioning of each of the in-room participants 4, 4', 4" in the augmented view 20 such that the in-room participants 4, 4', 4" are virtually positioned closer to each other and closer to the image sensor capturing the images 18.

The processing unit is configured for performing the virtual positioning of each of the in-room participants 4, 4', 4" in the augmented view 20 such that the relative positions of the in-room participants 4, 4', 4" relative to each other are maintained.

Figures 3A, 3B, 3C:
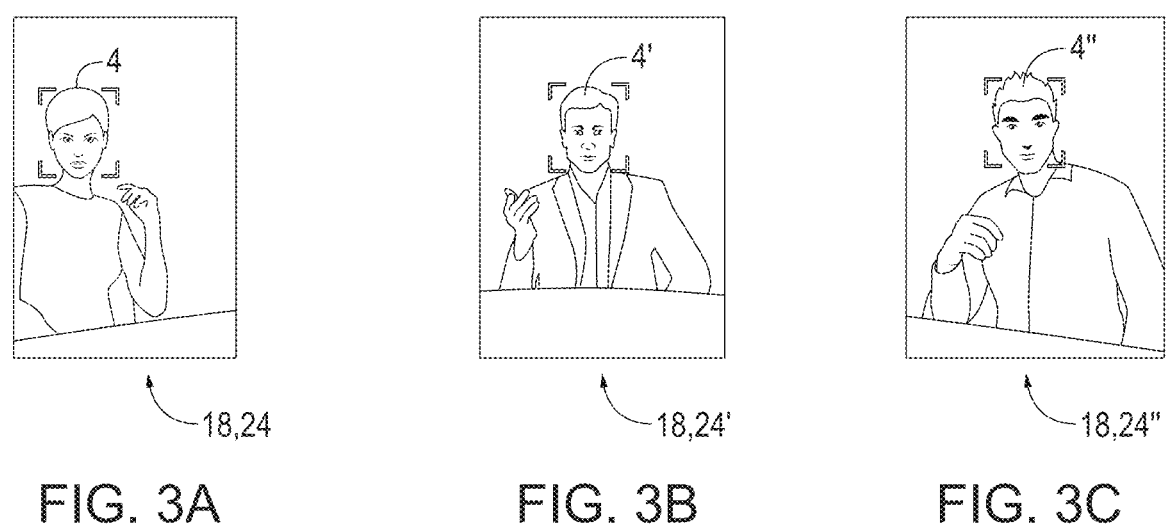
FIGS. 3a, 3b and 3c schematically illustrate an example of image processing of the captured image 18 to identify the in-room participants 4, 4', 4".

FIGS. 3*a*, 3*b* and 3*c* schematically illustrates an example of image processing of the captured image 18 to identify the in-room participants 4, 4', 4". The image processing of the captured image 18 to identify the in-room participants 4, 4', 4" may be performed by using one or more of virtual image segmentation; virtual cut-out to virtually separate the in-room participants from the background; virtual image resizing; and/or virtual seam carving.

Image segmentation is the process of partitioning a digital image 18 into multiple image segments 24, 24', 24", also known as image regions or image objects (sets of pixels). The goal of segmentation may be to simplify and/or change the representation of an image 18 into something that is easier to analyze. Image segmentation may be used to locate objects, such as the in-room participants 4, 4', 4", and boundaries (lines, curves, etc.) in images. More precisely, image segmentation may comprise a process of assigning a label to every pixel in an image 18 such that pixels with the same label share certain characteristics. The result of image segmentation may be a set of segments 24, 24', 24" that collectively cover a part of the image 18, the entire image 18, or a set of contours extracted from the image 18. Each of the pixels in a region may be similar with respect to some characteristic or computed property, such as color, intensity, or texture.

Seam carving is a computer graphics technique for resizing images 18 so as to preserve the main contents by selectively removing less important regions, as defined by "seams" (approximately horizontal or vertical paths of pixels).

Seam carving (or liquid rescaling) is an algorithm for content-aware image resizing. It functions by establishing a number of seams (paths of least importance) in an image 18 and automatically removes seams to reduce image size or inserts seams to extend it. Seam carving also allows manually defining areas in which pixels may not be modified, and features the ability to remove whole objects from photographs. Seams may be either vertical or horizontal. A vertical seam may be a path of pixels connected from top to bottom in an image with one pixel in each row. A horizontal seam is similar with the exception of the connection being from left to right. The importance/energy function values a pixel by measuring its contrast with its neighbor pixels. Seam carving may comprise calculating the weight/density/ energy of each pixel in an image. This can be done by various algorithms: gradient magnitude, entropy, visual saliency. From the energy, a list of seams may be made. Seams may be ranked by energy, with low energy seams being of least importance to the content of the image. Seams can be calculated via a dynamic programming approach. Then the low-energy seams may be removed as needed, and a final resized image may be obtained.

Thus, this technique may comprise producing many stitch lines and looking for clusters providing that many pixels of "dead space" can be removed. Dead space may be defined by the cost function embedded in an algorithm.

In FIGS. 3*a*, 3*b* and 3*c*, image processing of the captured image 18 is performed to identify the in-room participants 4, 4', 4" by e.g. partitioning the image 18 into three image segments 24, 24', 24", each segment comprising one in-room participant 4, 4', 4".

Figure 4:
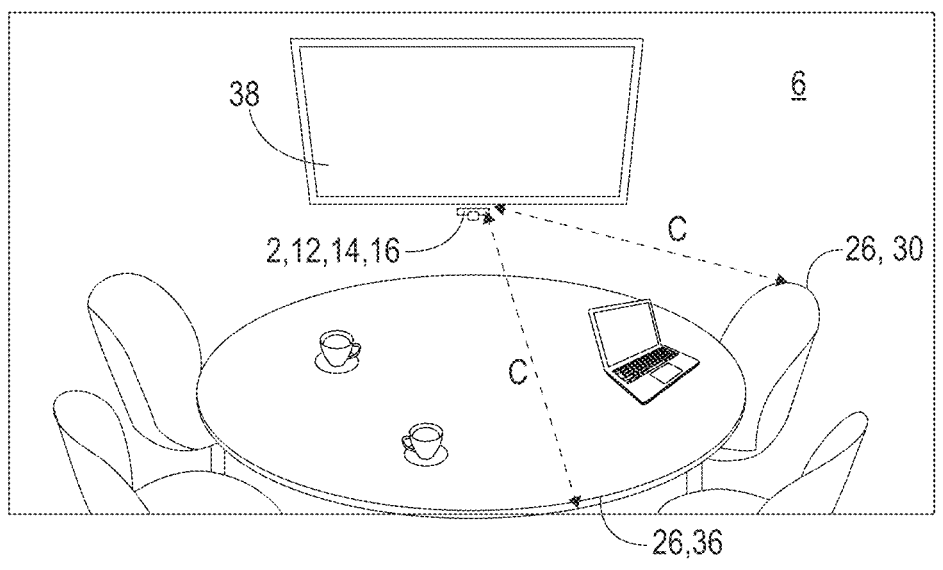
FIG. 4 schematically illustrates an example of the image sensor being configured to capture images 18 comprising the room 6 with no in-room participants.

FIG. 4 schematically illustrates an example of the device 2 comprising an image sensor 12 being configured to capture images 18 comprising the room 6 with no in-room participants. The device 2 also comprises a depth sensor 14 which is configured for measuring the distance to objects/parts 26 of the room 6, and the processing unit 16 is configured for mapping the room 6 with no in-room participants, by determining distances C between the depth sensor and one or more objects/parts 26 of the room 6.

Mapping the room 6 with no in-room participants may be referred to as "naked room capture" or "pre-meeting room capture". This can be used to obtain or provide a clean virtual background of the room 6, which can be used as the background of the augmented view, where the in-room participants are then virtually positioned according to their determined virtual sizes and positions.

The naked room capture can be obtained by capturing images 18 in the room 6 before the video-conference, such as on the same day. Alternatively and/or additionally, the naked room capture can be selected from a library of pre-made captures of the room, or other rooms. The naked room capture may be with or without chairs 30. The naked room capture will typically be with a conference table 36 in the room.

The depth sensor 14 is configured for measuring the distance C to objects/parts 26 of the room 6, and the objects 26 or parts 26 of the room 6 may be e.g. tables 36, chairs 30, walls, doors, windows, white boards etc.

Determining the distances C between the depth sensor and one or more objects/parts 26 of the room may comprise determining more different points at the objects/parts 26, e.g. more points on the table 36, such as points in different ends of the table 36 etc.

Determining the distances C between the depth sensor and one or more objects/parts 26 of the room may comprise determining distances C and angles α.

FIG. 4 shows that the device 2 comprises a display 38 configured for displaying the augmented view and the far-end participants.

The display 38 may be a screen, such as a TV screen. The display 38 or screen may show augmented view and the far-end participants, e.g. by displaying a video-feed of the far-end participant(s) or by showing a picture of the far-end participant(s) or showing a symbol, if the far-end participants do not have video recording enabled at their remote location.

Figure 5A:
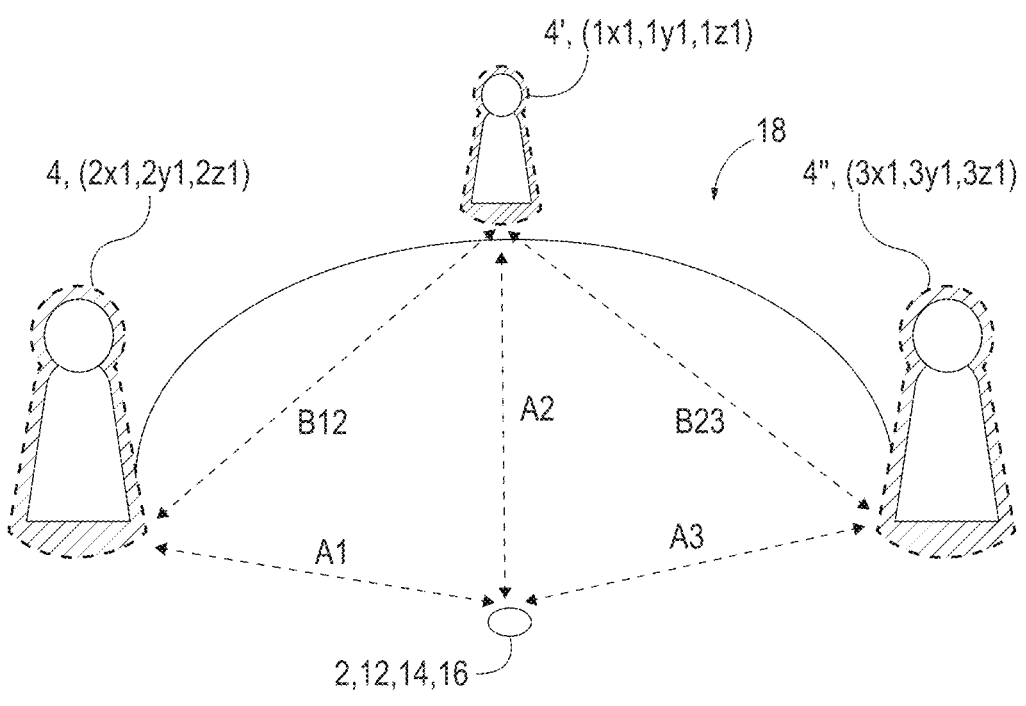
FIGS. 5a, 5b and 5c schematically illustrate an example of performing a virtual scaling of each of the in-room participants 4, 4', 4" to the desired virtual size, and performing a virtual positioning of each of the in-room participants 4, 4', 4" in the augmented view 20.
Figure 5B:
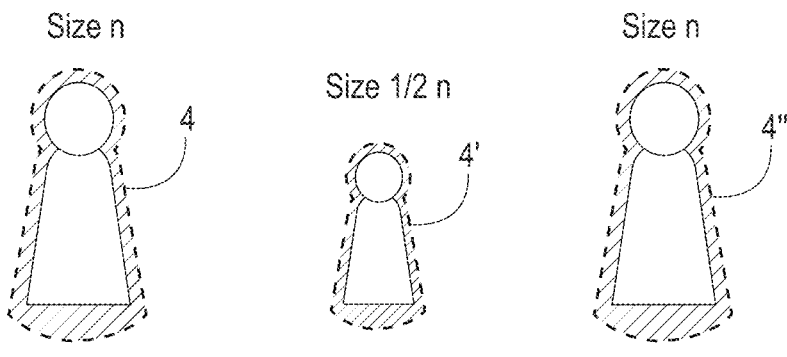
Figure 5C:
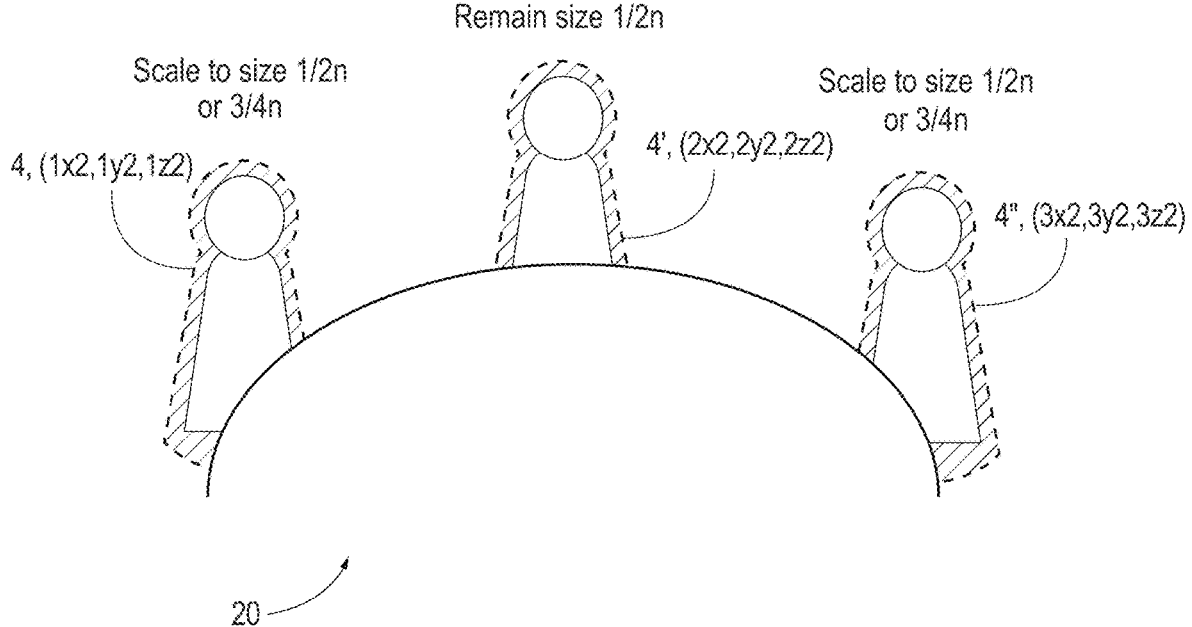

FIGS. 5*a*, 5*b* and 5*c* schematically illustrates an example of performing a virtual scaling of each of the in-room participants 4, 4', 4" to the desired virtual size, and performing a virtual positioning of each of the in-room participants 4, 4', 4" in the augmented view 20.

The processing unit 16 is configured to obtaining the measurement of the distance to each of the in-room participants 4, 4', 4" by the depth sensor 14. FIG. 5*a* shows that the processing unit 16 is configured to obtaining the captured images 18 by the image sensor 12. The processing unit 16 is configured to determining a desired virtual position for each of the in-room participants 4, 4', 4" in the augmented view 20. FIG. 5*b* shows that the processing unit 16 is configured to determining a scaling factor N for a desired virtual size of each of the in-room participants 4, 4', 4". The processing unit 16 is configured to performing a virtual scaling of each of the in-room participants 4, 4', 4" to the desired virtual size. FIG. 5c shows that the processing unit 16 is configured to performing a virtual positioning of each of the in-room participants 4, 4', 4" in the augmented view 20.

Thus, the in-room participants 4, 4', 4" are virtually positioned in the augmented view 20, e.g. on the virtual background of the room, to obtain an improved view, such as a view where the in-room participants 4, 4', 4" appear to sit closer to each other and closer to the image sensor.

The proportionality and the seating order of the in-room participants 4, 4', 4" may be maintained, since this will provide that the augmented view 20 looks more natural.

The processing unit 16 may be configured to:

determining a distance A to each of the in-room participants 4, 4', 4" thereby obtaining an actual position $(x1,y1,z1)$ of each in-room participant 4, 4', 4";

determining a distance B between the in-room participants 4, 4', 4";

determining a relative location of the in-room participants 4, 4', 4" based on the determined distance A and distance B;

determining the scaling factor N for the desired virtual size of each of the in-room participants 4, 4', 4" based on the determined distance A and distance B; and determining the virtual position $(x2,y2,z2)$ of each of the in-room participants 4, 4', 4" in the augmented view 20 based on the determined relative location of the in-room participants 4, 4', 4".

The distance A to each of the in-room participants 4, 4', 4" may be determined from the video-conference device 2 such as from the image sensor 12 and/or depth sensor and/or processing unit. Each in-room participant P, 4, 4', 4", may be at a unique distance A, thus a first in-room participant P1, 4, may be at a distance A1 having the actual position $(1x1, 1y1,1z1)$, and a second in-room participant P2, 4', may be at a distance A2 having the actual position $(2x1,2y1,2z1)$, and a third in-room participant P3, 4", may be at a distance A3 having the actual position $(3x1,3y1,3z1)$.

Both a distance A and an angle $\alpha$ may be determined for each in-room participant 4, 4', 4".

The distance B between the in-room participants 4, 4', 4" may be determined based on the obtained actual position $(x1,y1,z1)$ for each in-room participant 4, 4', 4". Thus a distance B12 between the first in-room participant P1, 4, and the second in-room participant P2, 4', may be determined based on their positions $(1x1,1y1,1z1)$ and $(2x1,2y1,2z1)$.

The scaling factor N for the desired virtual size of each of the in-room participants 4, 4', 4" may be determined, such that the scaling factor N1 for the first in-room participant P1, 4, is determined, and the scaling factor N2 for the second in-room participant P2, 4', is determined, and the scaling factor N3 for the third in-room participant P3, 4" is determined.

Figure 6A:
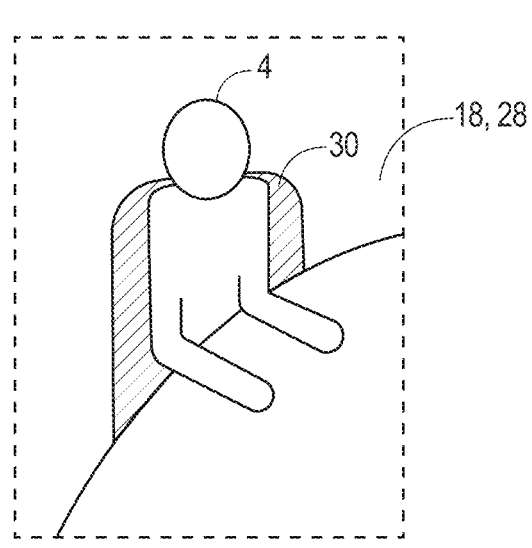
FIGS. 6a, 6b and 6c schematically illustrate examples of image processing of the captured image 18 to identify and separate an in-room participant 4 from the full image 18.
Figure 6B:
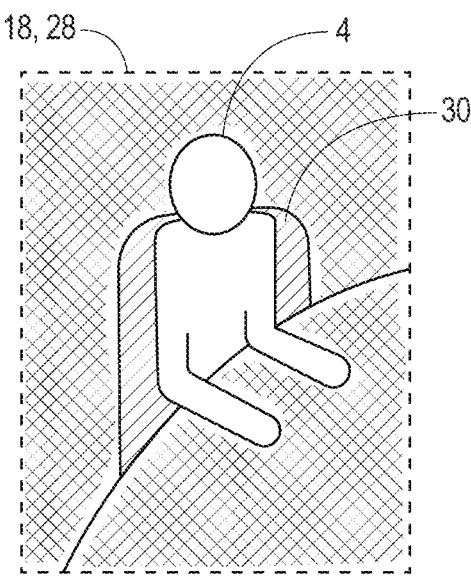
Figure 6C:
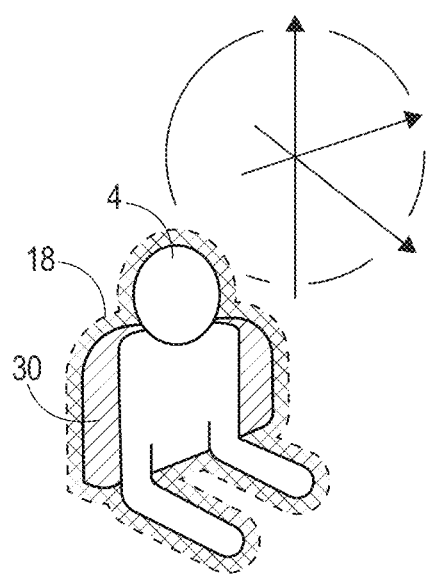

FIGS. 6a, 6b and 6c schematically illustrate examples of image processing of the captured image 18 to identify and separate an in-room participant 4 from the full image 18. The image processing of the captured image 18 to identify the in-room participant 4 may be performed by using one or more of:

a simple 2D boundary box 28 with the in-room participant 4 in a chair 30, see FIG. 6a.

a boundary box 28 with the in-room participant 4 in a chair 30 but with everything else in the box 28 being blurred, see FIG. 6b.

a depth-based, pixelated precision cut-out of the in-room participant 4 in a chair 30, see FIG. 6c.

Thus, the image processing may be performed in two-dimensions (2D), see e.g. FIG. 6a, and/or in three-dimensions (3D), see e.g. FIG. 6c.

If performing the image processing in two-dimensions, a single image sensor may be used. If performing the image processing in three-dimensions, more image sensors may be used, such as both an image sensor in front of the in-room participants, an image sensor on one or more sides of the in-room participants, and an image sensor behind the in-room participants. By having more than one image sensor, the in-room participants can be captured from more sides and hereby a 3D image can be obtained.

FIG. 6b shows an example where the processing unit is configured for performing blurring of objects in the augmented view of the room. The objects which may be blurred may be doors, windows, pictures, white boards etc. which are not desirable to see, such as to see clearly, in the video conference.

Figure 7:
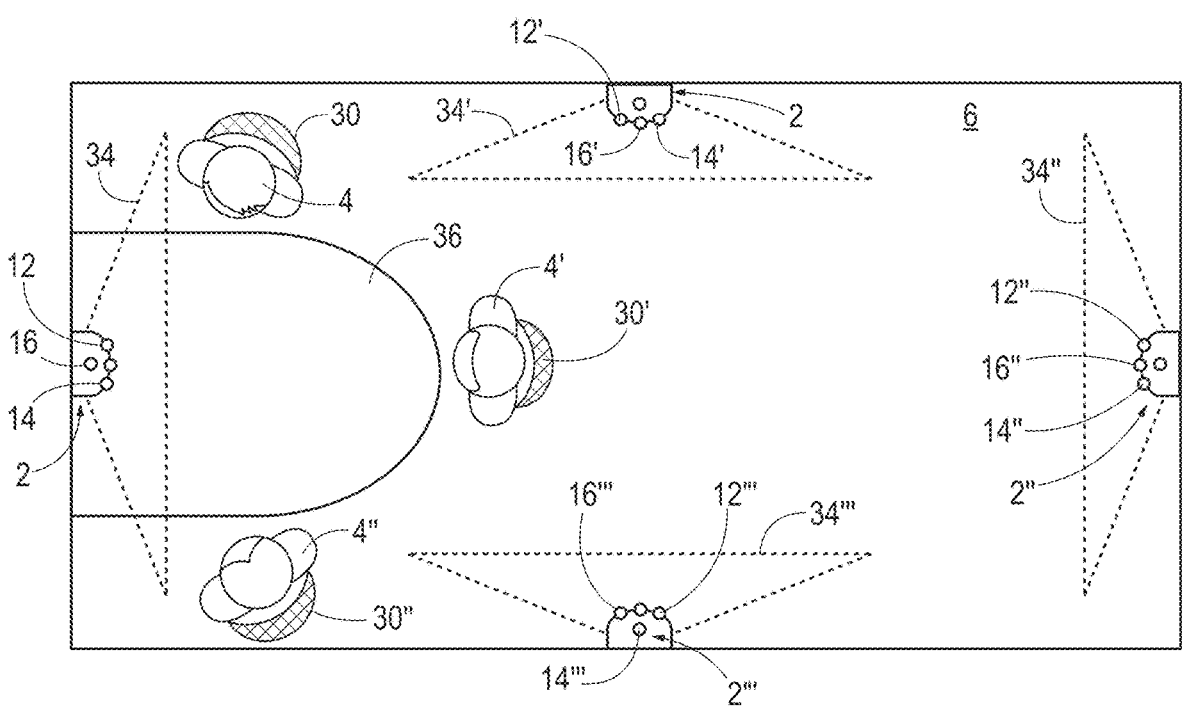
FIG. 7 schematically illustrates an example of a system comprising four video-conference devices 2, 2', 2", 2"" as described in FIG. 1.

FIG. 7 schematically illustrates an example of a system comprising four video-conference devices 2, 2', 2", 2"' as described in FIG. 1. If four video-conference devices 2, 2', 2", 2"" are provided in a room 6, then four image sensors 12, 12', 12", 12"" and four depth sensors 14, 14', 14", 14"" will be present in the room 6 at four locations, and this may provide that 3D images of the in-room participants 4, 4', 4" can be made.

Figure 8:
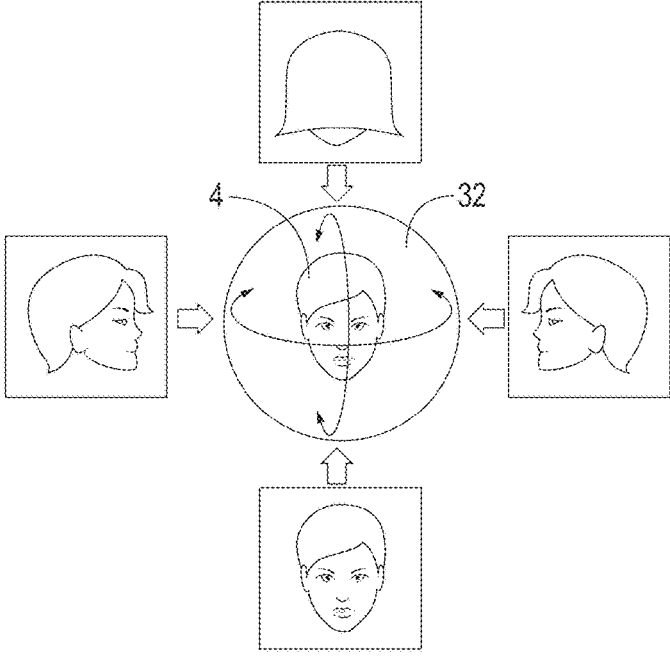
FIG. 8 schematically illustrates an example of a 3D capture of an in-room participant 4 for obtaining a 3D image/scan 32 of the in-room participant 4.

FIG. 8 schematically illustrates an example of a 3D capture of an in-room participant 4 for obtaining a 3D image/scan 32 of the in-room participant 4. The in-room participant 4 is captured from the front, see image in the button, from behind, see image in the top, from the left side, see image to the right, and from the right side, see image to the left.

Figure 9:
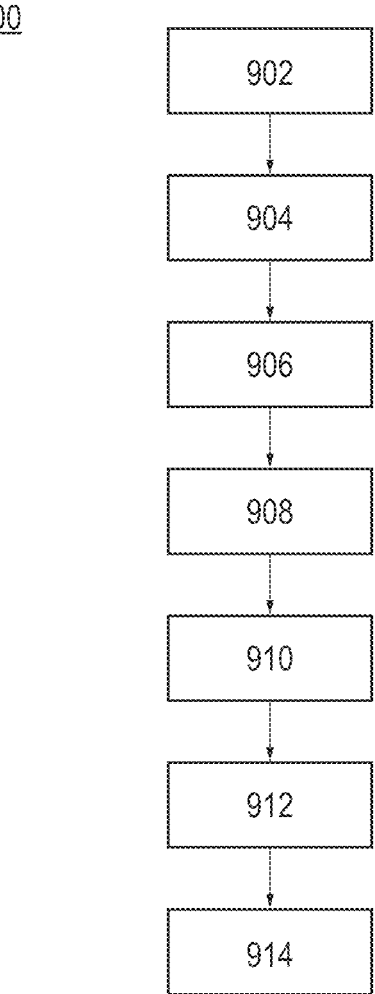
FIG. 9 schematically illustrates an example of a flow chart of a method 900, performed in a video-conference device, for providing an augmented view of in-room participants in the video-conference.

FIG. 9 schematically illustrates an example of a flow chart of a method 900, performed in a video-conference device, for providing an augmented view of in-room participants in the video-conference. The device is configured to be arranged in a room, where a first number of participants is the in-room participants present in the room while the video-conference is held, and a second number of participants is far-end participants present at one or more different locations than the room. The device comprises an image sensor configured for capturing images, the image sensor being configured to capture images comprising the room and the in-room participants. The device comprises a depth sensor configured for measuring the distance to each of the in-room participants. The device comprises a processing unit configured for providing the augmented view of the in-room participants by a processed/augmented video based on the captured images from the image sensor and the measurements by the depth sensor.

The method 900 comprises, in the processing unit:

obtaining (902) the measurements of the distance to each of the in-room participants by the depth sensor;

obtaining (904) the captured images by the images sensor;

performing (906) an image processing of the captured images from the image sensor to virtually identify each of the in-room participants;

determining (908) a desired virtual position for each of the in-room participants in the augmented view;

determining (910) a scaling factor for a desired virtual size of each of the in-room participants;

performing (912) a virtual scaling of each of the in-room participants to the desired virtual size in the augmented view; and performing (914) a virtual positioning of each of the in-room participants in the augmented view.

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

Items:

1. A video-conference device for providing an augmented view of in-room participants in a video-conference, the device is configured to be arranged in a room, where a first number of participants is the in-room participants present in the room while the video-conference is held, and a second number of participants is far-end participants present at one or more different locations than the room, wherein the device comprises:

an image sensor configured for capturing images, the image sensor being configured to capture images comprising the room and the in-room participants;

a depth sensor configured for measuring the distance to each of the in-room participants;

a processing unit configured for providing the augmented view of the in-room participants by a processed/augmented video based on the captured images from the image sensor and the measurements by the depth sensor;

wherein the processing unit is configured to:

obtaining the measurements of the distance to each of the in-room participants by the depth sensor;

obtaining the captured images by the images sensor;

performing an image processing of the captured images from the image sensor to virtually identify each of the in-room participants;

determining a desired virtual position for each of the in-room participants in the augmented view;

determining a scaling factor for a desired virtual size of each of the in-room participants;

performing a virtual scaling of each of the in-room participants to the desired virtual size in the augmented view; and performing a virtual positioning of each of the in-room participants in the augmented view.

2. The device of item 1, wherein the processing unit is configured for performing the virtual positioning of each of the in-room participants in the augmented view such that the in-room participants are virtually positioned closer to each other and closer to the image sensor capturing the images.

3. The device according to any of the preceding items, wherein the processing unit is configured for performing the virtual positioning of each of the in-room participants in the augmented view such that the relative positions of the in-room participants relative to each other are maintained.

4. The device according to any of the preceding items, wherein the device is configured to be located in one end of the room; and wherein the image sensor, the depth sensor and the processing unit of the device are co-located.

5. The device according to any of the preceding items, wherein the processing unit is configured to:

determining a distance A to each of the in-room participants thereby obtaining an actual position (x1,y1, z1) of each in-room participant;

determining a distance B between the in-room participants;

determining a relative location of the in-room participants based on the determined distance A and distance B;

determining the scaling factor N for the desired virtual size of each of the in-room participants based on the determined distance A and distance B; and determining the virtual position (x2,y2,z2) of each of the in-room participants in the augmented view based on the determined relative location of the in-room participants.

6. The device according to any of the preceding items, wherein the depth sensor comprises one or more of:

a time of flight (ToF) sensor configured for determining path lengths;

an infra-red sensor configured for determining distances based on reflected light;

an acoustic sensor configured for determining distances based on reflected audio.

7. The device according to any of the preceding items, wherein the image processing of the captured images to identify the in-room participants is performed by using one or more of:

virtual image segmentation;

virtual cut-out to virtually separate the in-room participants from the background;

virtual image resizing;

virtual seam carving.

8. The device according to any of the preceding items, wherein the image processing is performed in two-dimensions (2D) and/or in three-dimensions (3D).

9. The device according to any of the preceding items, wherein the depth sensor is configured for measuring the distance to objects/parts of the room, and wherein the image sensor is configured to capture images comprising the room with no in-room participants, and wherein the processing unit is configured for:

mapping the room with no in-room participants, by determining distances C between the depth sensor and one or more objects/parts of the room.

10. The device according to any of the preceding items, wherein the processing unit is configured for defining a suitable illumination in the augmented view based on the time of day of the video-conference.

11. The device according to any of the preceding items, wherein the processing unit is configured for performing blurring of objects in the augmented view of the room.

12. The device according to any of the preceding items, wherein the processing unit is configured for in accordance with a determination that a criterion for the virtual positioning of an in-room participant is not satisfied:

forgoing performing the virtual positioning of the in-room participant in the augmented view, and virtually placing the in-room participant in a dedicated picture/box in the augmented view.

13. The device according to any of the preceding items, wherein the device further comprises:

a display configured for displaying the augmented view and the far-end participants; and/or an audio output transducer configured for transmitting audio from the far-end participants to the room.

14. A system comprising at least two video-conference devices according to item 1.

15. A method, performed in a video-conference device, for providing an augmented view of in-room participants in the video-conference, the device is configured to be arranged in a room, where a first number of participants is the in-room participants present in the room while the video-conference is held, and a second number of participants is far-end participants present at one or more different locations than the room, wherein the device comprises an image sensor configured for capturing images, the image sensor being configured to capture images comprising the room and the in-room participants; a depth sensor configured for measuring the distance to each of the in-room participants; and a processing unit configured for providing the augmented view of the in-room participants by a processed/augmented video based on the captured images from the image sensor and the measurements by the depth sensor;

wherein the method comprises, in the processing unit:
  obtaining the measurements of the distance to each of the in-room participants by the depth sensor;
  obtaining the captured images by the images sensor;
  performing an image processing of the captured images from the image sensor to virtually identify each of the in-room participants;
  determining a desired virtual position for each of the in-room participants in the augmented view;
  determining a scaling factor for a desired virtual size of each of the in-room participants;
  performing a virtual scaling of each of the in-room participants to the desired virtual size in the augmented view; and
  performing a virtual positioning of each of the in-room participants in the augmented view.

LIST OF REFERENCES 2 video-conference device
4, 4', 4" in-room participants
6 room
8 far-end participants
10 different locations than the room 6
12, 12', 12", 12''' image sensor(s)
14, 14', 14", 14''' depth sensor(s)
16 processing unit
18 image(s)
20 augmented view(s)
22 dead space(s)
24, 24', 24" image segments
26 objects/parts of the room 6
28 2D boundary box 28
30 chair
32 3D image/scan of the in-room participant 4
34 dotted lines indicating the wide-angle view of the image sensor 12
36 table
38 display
900 method, performed in a video-conference device, for providing an augmented view of in-room participants in the video-conference
902 method step of obtaining the measurements of the distance to each of the in-room participants by the depth sensor;
904 method step of obtaining the captured images by the images sensor;

906 method step of performing an image processing of the captured images from the image sensor to virtually identify each of the in-room participants;
908 method step of determining a desired virtual position for each of the in-room participants in the augmented view;
910 method step of determining a scaling factor for a desired virtual size of each of the in-room participants;
912 method step of performing a virtual scaling of each of the in-room participants to the desired virtual size in the augmented view;
914 method step of performing a virtual positioning of each of the in-room participants in the augmented view.

The invention claimed is:

1. A video-conference device for providing an augmented view of in-room participants in a video-conference, wherein the device is configured to be arranged in a room, a first number of participants includes a number of in-room participants present while the video-conference is held, and a second number of participants includes a number of far-end participants present at one or more different locations other than the room, wherein the device comprises:
  an image sensor configured to capture images comprising the room and the in-room participants;
  a depth sensor configured to measure a distance from the device to each of the in-room participants;
  processing unit configured to provide the augmented view of the in-room participants by a processed/augmented video based on the captured images from the image sensor and the measurements by the depth sensor;
  wherein the processing unit is configured to:
  obtain the measurements of the distance from the device to each of the in-room participants by the depth sensor;
  obtain the captured images by the images sensor;
  perform an image processing of the captured images from the image sensor to virtually identify each of the in-room participants;
  determine a desired virtual position for each of the in-room participants in the augmented view;
  determine a scaling factor for a desired virtual size of each of the in-room participants;
  perform a virtual scaling of each of the in-room participants to the desired virtual size in the augmented view;
  perform a virtual positioning of each of the in-room participants in the augmented view;
  determine a distance A to each of the in-room participants thereby obtaining an actual position $(x1,y1,z1)$ of each in-room participant;
  determine a distance B between the in-room participants;
  determine a relative location of the in-room participants based on the determined distance A and distance B;
  determine the scaling factor N for the desired virtual size of each of the in-room participants based on the determined distance A and distance B; and
  determine the virtual position $(x2,y2,z2)$ of each of the in-room participants in the augmented view based on the determined relative location of the in-room participants.

2. The device of claim 1, wherein the processing unit is configured to perform the virtual positioning of each of the in-room participants in the augmented view such that the in-room participants are virtually positioned closer to each other and closer to the image sensor capturing the images.

3. The device of claim 1, wherein the processing unit is configured to perform the virtual positioning of each of the in-room participants in the augmented view such that the relative positions of the in-room participants relative to each other are maintained.

4. The device of claim 1, wherein the device is configured to be located at a non-central end of the room and the image sensor, the depth sensor and the processing unit of the device are also located in the room.

5. The device of claim 1, wherein the depth sensor comprises one or more of:

a time of flight (ToF) sensor configured for determining path lengths;

an infra-red sensor configured for determining distances based on reflected light; and an acoustic sensor configured for determining distances based on reflected audio.

6. The device according to claim 1, wherein the image processing of the captured images to identify the in-room participants is performed by using one or more of:

virtual image segmentation;

virtual cut-out to virtually separate the in-room participants from the background;

virtual image resizing; and virtual seam carving.

7. The device of claim 1, wherein the image processing is performed in two-dimensions (2D) and/or in three-dimensions (3D).

8. The device to of claim 1, wherein the depth sensor is configured to measure the distance to objects/parts of the room, and wherein the image sensor is configured to capture images comprising the room with no in-room participants, and wherein the processing unit is configured to:

map the room with no in-room participants, by determining distances C between the depth sensor and one or more objects/parts of the room.

9. The device of claim 1, wherein the processing unit is further configured to define a suitable illumination in the augmented view based on the time of day of the video-conference.

10. The device of claim 1, wherein the processing unit is further configured to perform blurring of objects in the augmented view of the room.

11. A video-conference device for providing an augmented view of in-room participants in a video-conference, wherein the device is configured to be arranged in a room, a first number of participants includes a number of in-room participants present while the video-conference is held, and a second number of participants includes a number of far-end participants present at one or more different locations other than the room, wherein the device comprises:

an image sensor configured to capture images comprising the room and the in-room participants;

a depth sensor configured to measure a distance from the device to each of the in-room participants;

processing unit configured to provide the augmented view of the in-room participants by a processed/augmented video based on the captured images from the image sensor and the measurements by the depth sensor;

wherein the processing unit is configured to:

obtain the measurements of the distance from the device to each of the in-room participants by the depth sensor;

obtain the captured images by the images sensor;

perform an image processing of the captured images from the image sensor to virtually identify each of the in-room participants;

determine a desired virtual position for each of the in-room participants in the augmented view;

determine a scaling factor for a desired virtual size of each of the in-room participants;

perform a virtual scaling of each of the in-room participants to the desired virtual size in the augmented view;

perform a virtual positioning of each of the in-room participants in the augmented view; and in accordance with a determination that a criterion for the virtual positioning of an in-room participant is not satisfied:

forgo performing the virtual positioning of the in-room participant in the augmented view, and virtually place the in-room participant in a dedicated picture/box in the augmented view.

12. The device of claim 1, wherein the device further comprises at least one of:

a display configured to display the augmented view and the far-end participants; or an audio output transducer configured to transmit audio from the far-end participants to the room.

13. A system comprising at least two video-conference devices according to claim 1.

14. A method, performed in a video-conference device, for providing an augmented view of in-room participants in the video-conference, wherein:

the device is configured to be arranged in a room, a first number of participants is the in-room participants present in the room while the video-conference is held, a second number of participants is far-end participants present at one or more different locations than the room, the device comprises;

an image sensor configured to capture images comprising the room and the in-room participants;

a depth sensor configured to measure the distance to each of the in-room participants; and a processing unit configured to provide the augmented view of the in-room participants by a processed/augmented video based on the captured images from the image sensor and the measurements by the depth sensor;

wherein the method comprises, by the processing unit:

obtaining the measurements of the distance to each of the in-room participants by the depth sensor;

obtaining the captured images by the images sensor;

performing an image processing of the captured images from the image sensor to virtually identify each of the in-room participants;

determining a desired virtual position for each of the in-room participants in the augmented view;

determining a scaling factor for a desired virtual size of each of the in-room participants;

performing a virtual scaling of each of the in-room participants to the desired virtual size in the augmented view;

performing a virtual positioning of each of the in-room participants in the augmented view;

determining a distance A to each of the in-room participants thereby obtaining an actual position (x1,y1,z1) of each in-room participant;

determining a distance B between the in-room participants;

determining a relative location of the in-room participants based on the determined distance A and distance B;

determining the scaling factor N for the desired virtual size of each of the in-room participants based on the determined distance A and distance B; and determining the virtual position (x2,y2,z2) of each of the in-room participants in the augmented view based on the determined relative location of the in-room participants.

15. The device of claim 11, wherein the processing unit is configured to perform the virtual positioning of each of the in-room participants in the augmented view such that the in-room participants are virtually positioned closer to each other and closer to the image sensor capturing the images.

16. The device of claim 11, wherein the processing unit is configured to perform the virtual positioning of each of the in-room participants in the augmented view such that the relative positions of the in-room participants relative to each other are maintained.

17. The device of claim 11, wherein the device is configured to be located at a non-central end of the room and the image sensor, the depth sensor and the processing unit of the device are also located in the room.

18. The device of claim 11, wherein the depth sensor comprises one or more of:

a time of flight (ToF) sensor configured for determining path lengths;

an infra-red sensor configured for determining distances based on reflected light; and an acoustic sensor configured for determining distances based on reflected audio.

19. The device according to claim 11, wherein the image processing of the captured images to identify the in-room participants is performed by using one or more of:

virtual image segmentation;

virtual cut-out to virtually separate the in-room participants from the background;

virtual image resizing;

virtual seam carving.

\* \* \* \* \*